United States Patent [19]
Palmer et al.

[11] Patent Number: 5,951,379
[45] Date of Patent: Sep. 14, 1999

[54] BUMPER POLISHING MACHINE

[75] Inventors: Peter R. Palmer, Oakville; Brian M Murdock; J. Kenneth Schwenker, both of Cambridge, all of Canada

[73] Assignee: A.G. Simpson Co. Limited, Canada

[21] Appl. No.: 08/921,488

[22] Filed: Sep. 2, 1997

[51] Int. Cl.⁶ ........................................... B24B 7/07
[52] U.S. Cl. ........................... 451/65; 451/182; 451/331; 451/387; 451/913
[58] Field of Search ............................. 451/65, 182, 312, 451/313, 314, 331, 380, 387, 913

[56] References Cited

U.S. PATENT DOCUMENTS

| | | |
|---|---|---|
| 1,850,465 | 3/1932 | Kranich . |
| 2,166,461 | 7/1939 | Carlson . |
| 2,716,311 | 8/1955 | Berstecher . |
| 3,593,464 | 7/1971 | Bell . |
| 3,755,969 | 9/1973 | Stoy . |
| 3,886,690 | 6/1975 | Plantevin et al. . |
| 3,898,767 | 8/1975 | Kobayashi . |
| 4,023,229 | 5/1977 | Blight . |
| 4,052,928 | 10/1977 | Pierrat et al. . |

*Primary Examiner*—Timothy V. Eley
*Attorney, Agent, or Firm*—Young & Basile, P.C.

[57] ABSTRACT

A bumper finishing apparatus comprises a guided fixture for carrying a bumper past a fixed rotary finishing head. An external drive moves the fixture as guided by a guide profile to coordinate travel of the bumper past the finishing head so that the finishing head abrades the bumper surface in a manner to achieve the desired finish.

22 Claims, 7 Drawing Sheets

BUMPER POLISHING MACHINE

FIELD OF THE INVENTION

This invention relates to bumper finishing equipment and more particularly to fixtures for use in such equipment as well as an overall system for finishing bumper surface in preparation for finish coating.

BACKGROUND OF THE INVENTION

The finishing of stamped vehicle bumpers which, for example, are common to automobiles, trucks, tractors, buses and the like is very difficult, because of the wide variety of bumper curvatures. Vehicles are stylized to suit the manufacturer's requirements and hence bumpers for those particular vehicles have to fit with the stylized appearance. In view of there being so many different types of bumper shapes, it is difficult to build a single system which is capable of finishing all different types of bumpers. This has been a constant problem for bumper manufacturers which even to this day still rely to some extent on hand finishing of bumpers. Many attempts have been made in providing bumper polishing machines which move the finishing head in a variety of directions to achieve finishing or have in a line a variety of finishing heads positioned at various angles to finish the bumper as the bumper is passed in a single orientation through the line. It is common to use a variety of flap wheels and the like to finish the bumper surface in preparing it for final treatment, but due to varying bumper shapes, the abrading wheels wear quickly because there is sometimes lack of control and over pressure exerted on the abrading wheel.

A bumper finishing machine which is sensitive to various surfaces of the bumper is described in U.S. Pat. No. 3,593,464. The finishing head is mounted on a carriage which is capable of moving the bumper in various directions as the abrading head contacts the bumper. This system is provided to achieve as much versatility as possible with respect to the various positions in which the bumper may be supported while it is being refinished. Such system is inherently complex in nature and difficult to maintain in the difficult environment of the finishing area.

U.S. Pat. No. 2,166,461 describes the use of a cam system to vary the position of the article to be finished as it passes beneath the finishing heads which are located about a rotary table. U.S. Pat. No. 2,716,311 describes a centreless machine device which is capable of finishing the outside surface of the article where that surface is of irregular shape.

Accordingly, this invention overcomes a number of the above problems by providing a finishing system having one or more fixed rotary finishing heads where the bumper is guided past the finishing head in a controlled manner to polish the unique longitudinal curvature of the particular style of bumper.

SUMMARY OF THE INVENTION

In accordance with an aspect of the invention, a fixture for use in an apparatus for finishing a longitudinally extending bumper surface of a particular style comprises:

i) a jig for supporting a bumper and means for securing a bumper to the jig;

ii) a guide having a contoured profile which is unique to and follows a longitudinal contour peculiar to a style of bumper to be secured in the jig;

iii) means for supporting said jig above and connecting the jig to the guide; and iv) the fixture having means engagable by an external drive for advancing the guide along its contoured profile.

In accordance with a further aspect of the invention, an apparatus for finishing a longitudinally extending bumper surface of a particular style comprises:

i) a rotary finishing head positioned in the desired orientation above a worktable surface;

ii) a fixture for carrying a bumper past the rotary finishing head, the fixture having a guide with a contoured profile which is unique to and follows a longitudinal contour peculiar to a style of bumper to be secured in the jig;

iii) an external drive for engaging the fixture and advancing the guide along its contoured profile to guide movement of the fixture in coordinating travel of a unique contoured surface of a bumper in the fixture past the finishing head.

In accordance with another aspect of the invention, a method for finishing a longitudinally extending bumper surface of a particular style comprises:

i) securing the bumper on a guided fixture wherein a guide has a contoured profile which matches in shape a unique contoured surface of the bumper to be finished;

ii) positioning a rotary finishing head in an orientation to finish the unique contoured surface;

iii) guiding movement of the fixture by way of the guide profile to coordinate travel of the unique contoured bumper surface past the finishing head.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
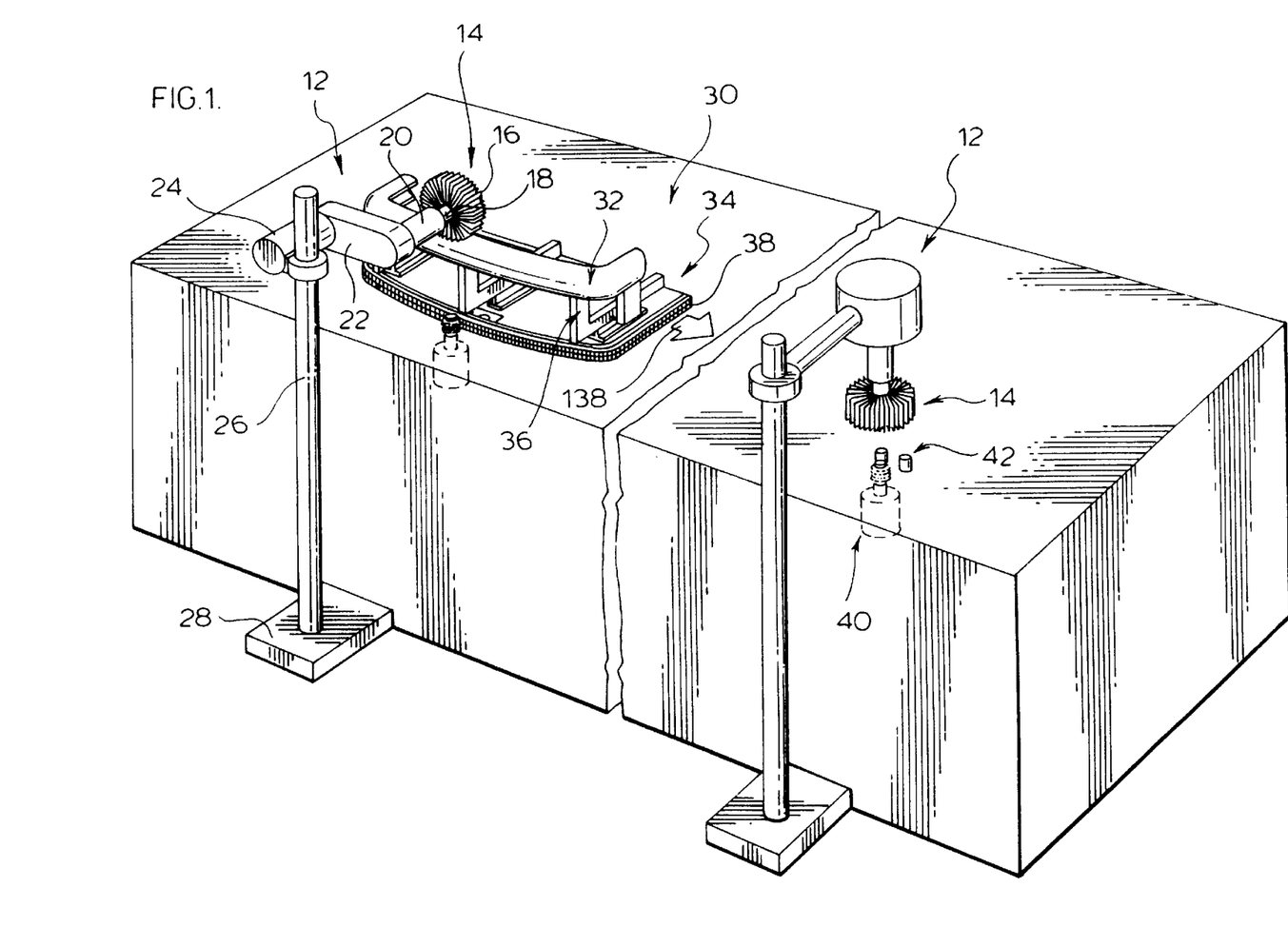
FIG. 1 is a perspective view of two stations for polishing and finishing a bumper surface.

Normal bumper manufacturing involves working by stamping or rolling or like procedure to produce a vehicle bumper of desired design. The vehicle style depicts the bumper style where both function and decorative aspects for each style of vehicle must be met. The functional aspects dictate that the bumper is of substantial structure and is capable of withstanding the usual impact as prescribed by various regulatory agencies around the world. By virtue of the substantial nature of the bumper, the manufacturing process leaves the formed bumper with a surface which has to be finished before the final treatment, such as chrome, paint, or plastic laminate is applied to its face. Various types of rotary abrasive devices may be used in finishing and polishing the bumper surface. The rotary devices may include solid abrasive wheels, flexible abrasive discs, abrasive carrying polishing drums, abrasive flap wheels and the like. In respect of the embodiment of the invention shown in FIG. 1, abrasive flap wheel finishing devices 12 are shown. Each finishing device 12 has the standard abrasive flap wheel 14 which carries individual flaps 16 secured to a central rotor 18. The rotor 18 is connected to a spindle 20 which is driven by belt drive system in housing 22 by motor 24. A standard 26 supports the motor 24 from a base 28. The base is located adjacent to the table work surface 30. It is appreciated that one or more work stations may be provided on the work table 30 depending upon the complexity of the bumper design. Although FIG. 1 is exemplary of a two-station system for finishing bumper surfaces, it is understood that complex bumper surfaces may need additional stations. The finishing heads will be angled to match the surface being finished or buffed. As a result, bumpers may require two, three, four or more distinct finishing head orientations to finish the bumper surface. In addition, during the finishing operation, the surface is treated with finishing heads having various grits or polishing abrasives. Such arrangement provides for multiple passes of the same grit or multiple heads of various grits in achieving various finishing operations. Multiple passes may be required under each finishing head or multiple similar set ups may be required to achieve the desired finish. With this in mind, the following discussion of the various embodiments as it would relate to one or two workstations, it is understood that several other workstations may be interpreted as being part and parcel of the finishing system.

The bumper 32 is supported by and secured to a fixture 34 which includes a jig 36. The movement of the fixture 34 is determined by guide 38. The fixture may be driven by any suitable drive mechanism to advance the fixture along the table where such movement follows the guide 38. In accordance with this particular preferred embodiment, the guide 38 is engaged by an external drive 40 and a guide follower 42.

Figure 2:
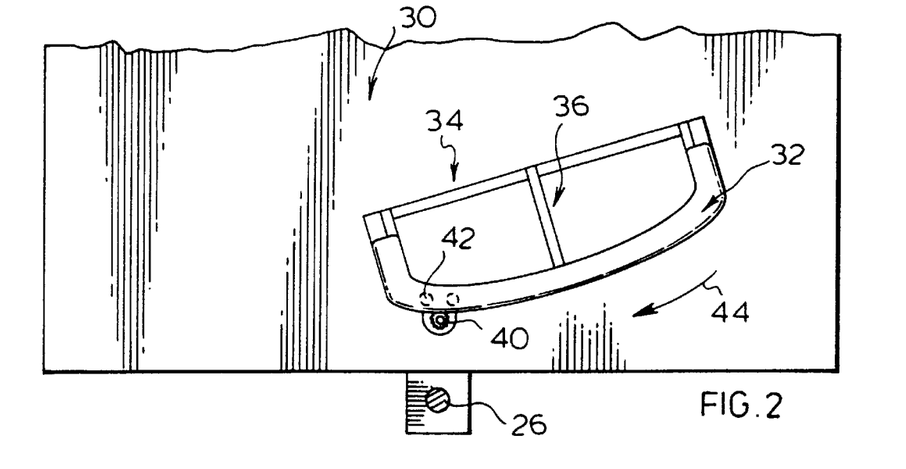
FIGS. 2, 3 and 4 are sequential top plan views of the cam guided movement of the bumper fixture.
Figure 3:
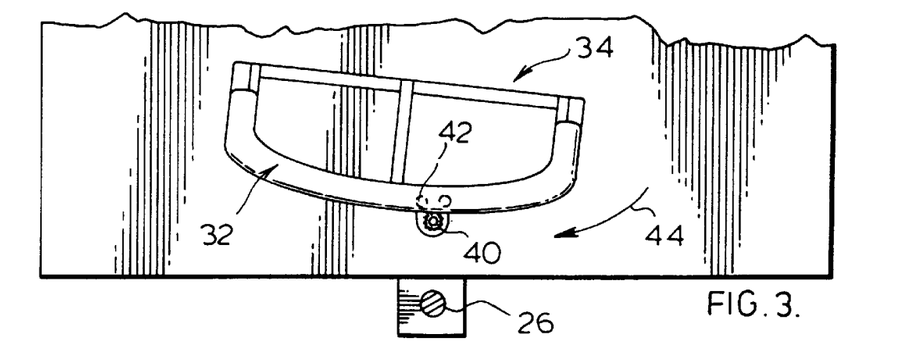
Figure 4:
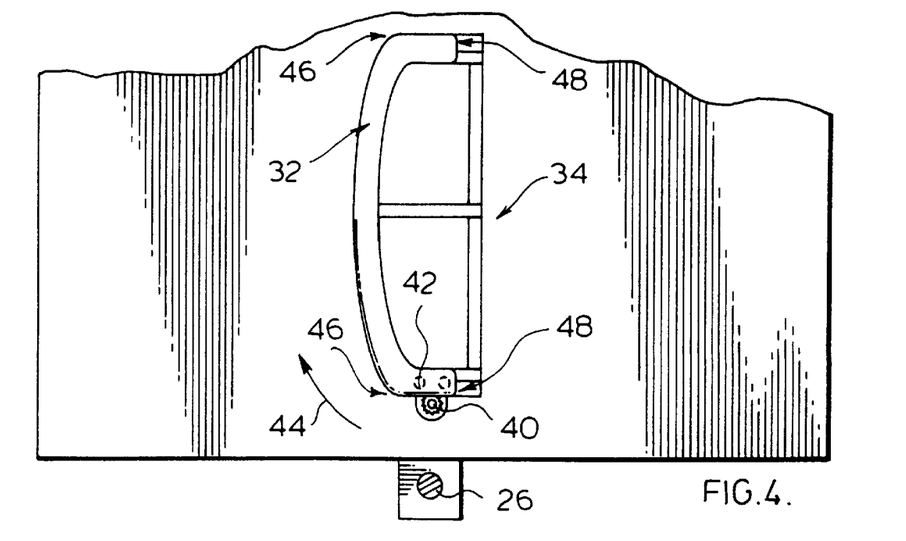

The sequential views of FIGS. 2, 3 and 4 demonstrate the guided travel of the bumper past the rotary polishing head which may be fixed in a desired orientation. As shown in FIG. 2, the external drive 40 has engaged the fixture to drive the fixture in the direction of arrow 44. Due to the positioning of the guide follower 42 engaging the guide profile, the fixture is then moved in a manner which coordinates travel of the surface of the bumper 32 to be polished with the position of the rotary polishing head. The guide profile resembles that of the bumper so that as the guide is driven past the guide followers 42, the fixture is moved through the horizontal plane of the work surface 30 to position the unique contoured surface of the bumper beneath the finishing head. As shown in FIG. 3, as the fixture 34 continues to move in the direction of arrow 44, its orientation is changed to position properly the contoured surface of the bumper beneath the polishing head. As shown in FIG. 4, continued movement in the direction of arrow 44, the drive 40 has advanced around the corner portion 46 of the bumper so that the region around to end tip 48 of the bumper is finished by the rotary finishing head.

Figure 5:
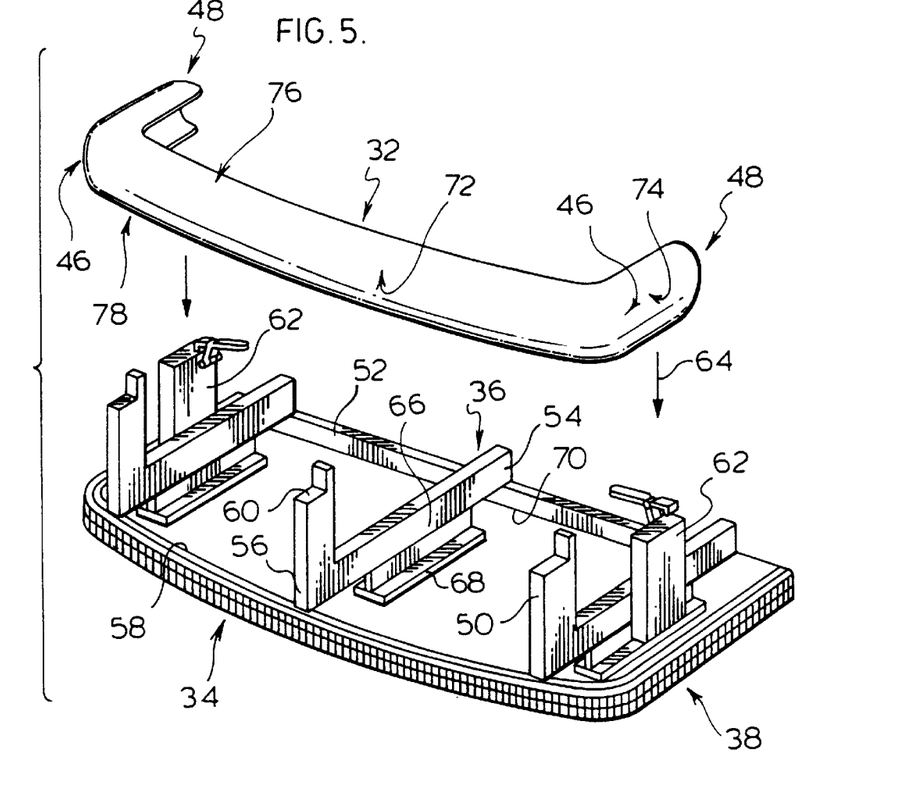
FIG. 5 is perspective view of the cam guided fixture with a bumper to be mounted therein.

The details of the structure of this system is shown in more detail in respect of FIGS. 5 through 8. As shown in FIG. 5, the fixture 34 has a jig 36 which comprises standards 50. The standards 50 are interconnected by rear plate 52 at their rearward portions 54. At their forward portions 56 they are connected to an upper component 58 of the guide 38. The standard forward portions 56 include bumper rests 60 as well as clamps 62. The bumper 32 is lowered in the direction of arrow 64 onto the bumper rests 60 and clamped in clamp 62 to fix the position of the bumper 32 relative to the fixture 36. On the face portion 66 of each standard is a support plate 68. The guide 38, support plate 68 and rear plate 52 may include a friction-reducing material, rollers or the like. Preferably, the fixture includes a friction-reducing material 70, such as an ultra high density plastic, particularly ultra high density plastic. Such materials facilitate movement of the fixture through a horizontal plane as defined by the work surface 30.

As will be described in respect of the subsequent figures, the bumper 32 is of a particular style. The bumper has a front face 72 which is somewhat curved and leads into the corner portions 46 and receeds rearwardly to define side bumper portions 74 which terminate at bumper ends 48. The bumper is curved in several directions to suit the style of the vehicle. One of the benefits in using a flap wheel abrasive polishing head is that the flaps of abrasive accommodate a slight degree of curvature on the surface to be finished. With this particular bumper design, as previously discussed, at least two finishing stations are required. The first finishing station can finish the front and side surfaces 72 and 74. The second station can finish the top portions 76 of those surfaces as well as the bottom portions 78 of those surfaces. In accordance with the embodiment of FIG. 1, the upper and lower surfaces 76 and 78 could be finished at the first station by inverting the bumper after the first surface is finished, where the flap wheel rotates about a substantially horizontal axis. The second station would finish the outer surfaces where the flap wheel rotates about a substantially vertical axis. In accordance with this particular embodiment, the axes of rotation for the flap wheel may be essentially normal to each other; however, it is understood that a multitude of other orientations are possible depending on the bumper shape.

Figure 6:
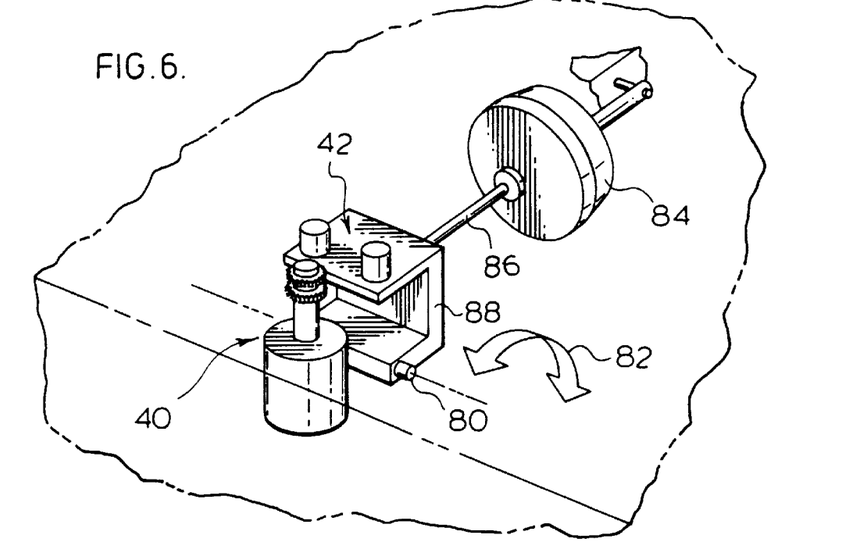
FIG. 6 is a perspective view of the external drive and cam engaging mechanism.

In order for the guide to control the movement of the fixture 34, in accordance with this particular embodiment, an external drive 40, as shown in FIG. 6, engages the guide 38. It is understood, however, that the external drive 40 may engage some other portion of the fixture to drive it through the device which reads or follows the outline of the guide profile to move the fixture as required to ensure proper positioning as the bumper passes the finishing head. In accordance with this particular preferred embodiment, the guide 38 is sandwiched between the external drive 40 and the guide follower 42. The guide follower 42 pivots about pivot rod 80 so as to pivot in the direction of arrow 82. Such pivotal movement is determined by an actuator, such as an air piston cylinder or hydraulic cylinder 84 which extends or retracts rod 86. As in shown in more detail in FIG. 7, rod 86 is connected to the base 88 of the guide follower 42. As the guide follower 42 is moved towards the external drive 40, the guide 38 is sandwiched or gripped between the external drive 40 and the guide follower 42.

Figure 7:
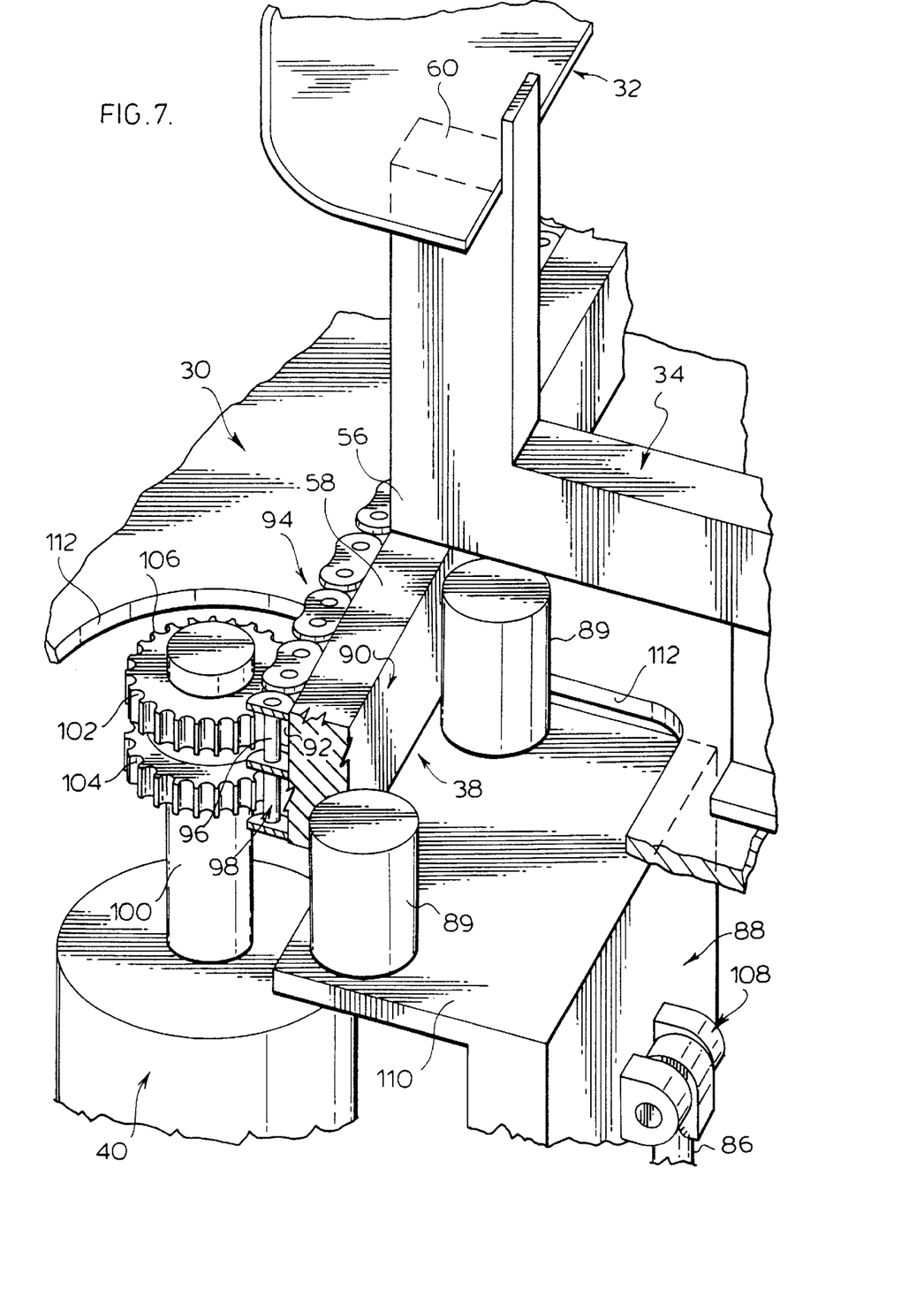
FIG. 7 is an exploded view of the cam being engaged by the external drive.

As shown in FIG. 7, the worktable surface 30 supports the fixture 34 with the bumper 32 on its respective seat 60. The forward portion 56 of the standard is secured to the top portion 58 of the guide 38. In accordance with this particular embodiment, the guide 38 has a contoured profile defined by working surface 90 which is unique to and follows a longitudinal contour peculiar to the style of the bumper. Secured to the outside 92 of the guide 38 is a link chain 94 which, in accordance with this particular embodiment, comprises two link chains 96 and 98. The external drive 40 has driveshaft 100 to which two drive sprockets 102 and 104 are connected and keyed, so that the teeth 106 mesh with the links of the link chain 94. As the guide follower base 88 is pivoted towards the drive sprockets 102 and 104, the guide 38 is gripped between the drive sprockets 102, 104 and the guide follower which, in accordance with this particular embodiment, is a pair of spaced apart rollers 89. The drive sprockets 102 and 104 are located between the spaced-apart rollers 89. As shown in FIG. 7, the rod 86 is connected to the back 88 of the guide follower by a clevis 108. The guide follower rollers 89 are mounted to swing through an arc on the top plate 110 of the guide follower system. As shown in FIG. 7, a cut-out 112 is provided to accommodate the reciprocating movement of the guide follower 42. That cut-out 112 may extend beyond the other side of the guide 38 to accommodate the drive shaft 100 with drive sprockets 102 and 104 above the horizontal plane of the work surface 30.

Figure 8:
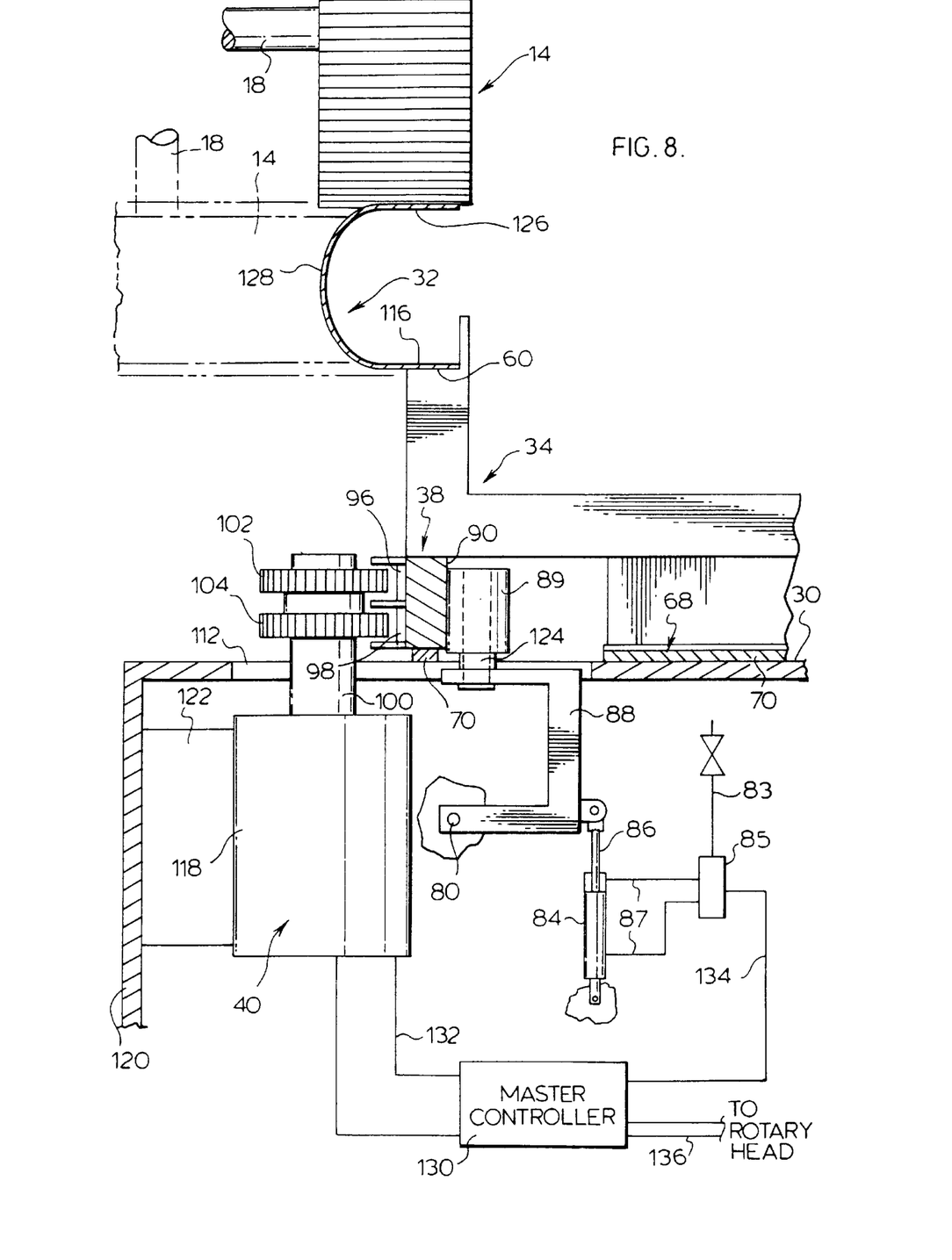
FIG. 8 is a section through the apparatus of FIG. 1 showing the cam guided fixture engaged by the external drive with the finishing head in position to finish the bumper contour.

As shown in FIG. 8, the fixture 34 positions the bumper 32 at the proper location beneath the flap polishing wheel 14. In this particular embodiment, the polishing wheel 14 rotates about drive shaft 18 having a horizontal axis. As shown in dot, the flap wheel 14 may also rotate about a vertical axis for the drive shaft 18 or at any other angle depending on bumper shape. The bumper 32 has its lower lip 116 supported on the rest 60 of the fixture 34. The lower plate 68, in accordance with this embodiment, rests on top of the work surface 30. The external drive 40 has a motor 118 secured to the face 120 by motor mount 122. The guide 38 includes a friction reducing material 70 on its underside to facilitate its movement on the work table 30. In addition, plate 68 may also include friction reducing material 70 to facilitate movement on the worktable 30. It is understood that the plate of friction reducing material accommodates grit that will fall onto the worktable during the polishing process. The guide 38 has its contoured profile working surface 90 abutting the follower rollers 89 which are rotatably mounted on spindles 124. The drive sprockets 102 and 104 engage the double link chain 96, 98 to ensure positive drive of the guide 38 past the follower rollers 89. As the driveshaft 100 rotates either clockwise or counterclockwise, the guide is driven correspondingly in that direction. The follower rollers 89 then guide movement of the fixture based on the guide profile to position the contoured surface 126 of the bumper beneath the polishing head 14. Correspondingly, at the second station the guide follower positions the contoured surface 128 to contact the finishing wheel 14. As schematically shown in FIG. 8, the finishing wheel 14 overlaps the surface polish by the finishing wheel which is in the horizontal orientation although at a separate station.

A master controller 130 is electrically connected by wires 132 to the drive motor 118, by wire 134 to the piston controller 85 and by wires 136 to the one or more drive motors 24 of the rotary polishing heads. Compressed air is supplied to air piston/cylinder 84 via lines 87 through air supply controller 85 which controls supply of compressed air in line 83 to cause the follower rollers 89 to grip or release the guide 38. It is appreciated that a similar arrangement may be provided where pressurized hydraulic fluid is supplied in a controlled manner to a hydraulic cylinder to pivot the guide follower. The master controller 130 may be programmed to determine the RPM of the driveshaft 100 relative to the speed of the rotary polishing heads so that the bumper is advanced past the polishing head at the desired linear speed. The master controller also controls the opening and closing of the follower rollers 89 to either clamp the guide for driving and guiding the fixture past the finishing wheel or to release the guide so that the fixture may be advanced in the direction of arrow 138 as shown in FIG. 1 to the second finishing station for re-engagement.

Figure 9:
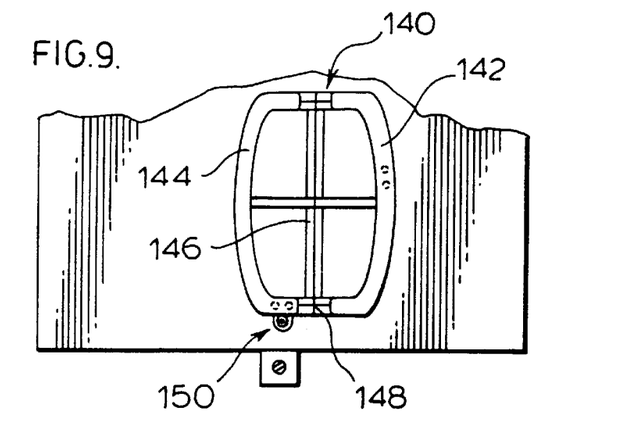
FIG. 9 is a top plan view of an alternative embodiment for the fixture which is adapted to carry two bumpers with two guides.

In accordance with an alternative embodiment, it is appreciated that the fixture 140 of FIG. 9 may be modified to support two bumpers 142 and 144. The fixture 140 has the support system 146 for the bumpers. A guide 148 may be provided beneath the bumpers 142 and 144 and which is engaged by the external drive 150 in the manner described with respect to the preceding figures. The guide follows the profile to direct movement of the first bumper 142 beneath the finishing head and continues rotation to pass the second bumper 144 beneath the finishing head, or along side the finishing head depending upon the finishing head orientation. In this manner, at each finishing station, two bumpers may be finished in the same fixture in sequence before being moved on to the next station.

Figure 10:
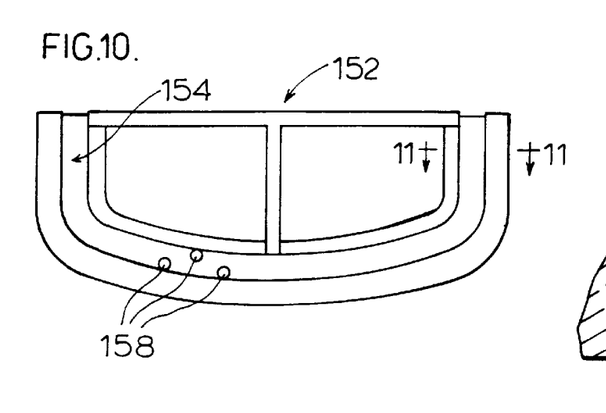
FIG. 10 is a plan view of the bottom of an alternative guide for the fixture.
Figure 11:
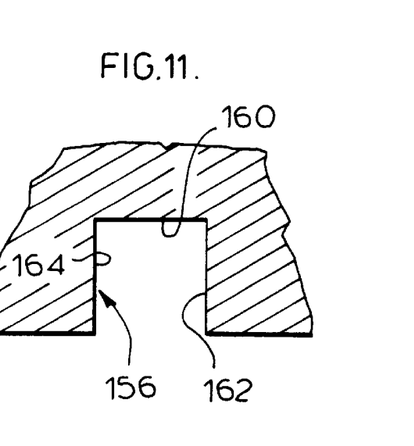
FIG. 11 is partial section along the lines 11—11 of FIG. 10.

FIGS. 10 through 13 show alternative embodiments for the guides for the fixture. As shown in FIG. 10, the fixture 152 has a guide 154 which is defined by a U-shaped channel 156. A suitable guide follower, which may be in the form of three rollers 158 spaced apart in a triangular manner, fit within the width of the channel 156 as defined by the base 160, where the three rollers abut the respective sides 162 and 164 so as to follow the profile of the channel 156. The rollers 158 are stationary on the worktable surface, so that as the fixture is moved the rollers, in following the profile, correspondingly position the bumper as it passes beneath or alongside the finishing head.

Figure 12:
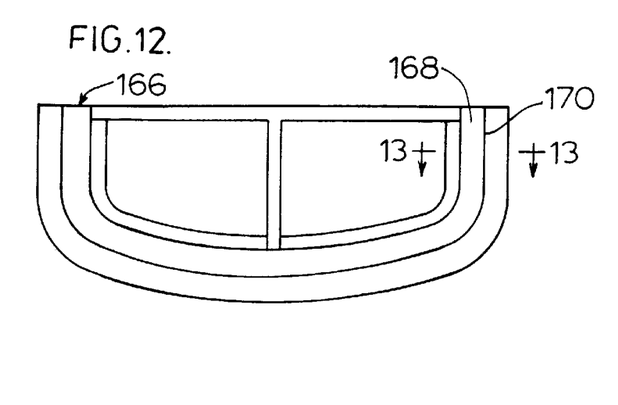
FIG. 12 is a plan view of the bottom of an alternative embodiment for the fixture.
Figure 13:
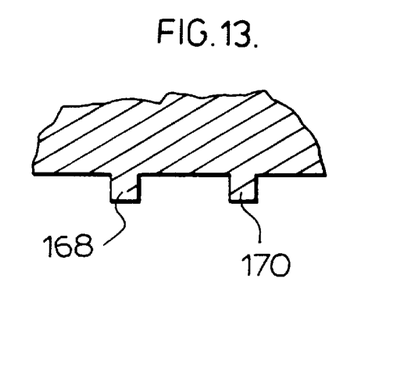
FIG. 13 is a partial section along the lines 13—13 of FIG. 12.

Similarly, with respect to the embodiment of FIGS. 12 and 13, a track 166 is provided having rails 168 and 170. The worktable would be provided with dolleys, track wheels or the like which would engage rails 168 and 170. The wheels would be located on the worktable, such that when the fixture is driven by the external drive, the wheels in following the profile of the rails correspondingly direct the bumper either beneath or alongside the finishing head in the manner described with respect to the earlier embodiments.

Figure 14:
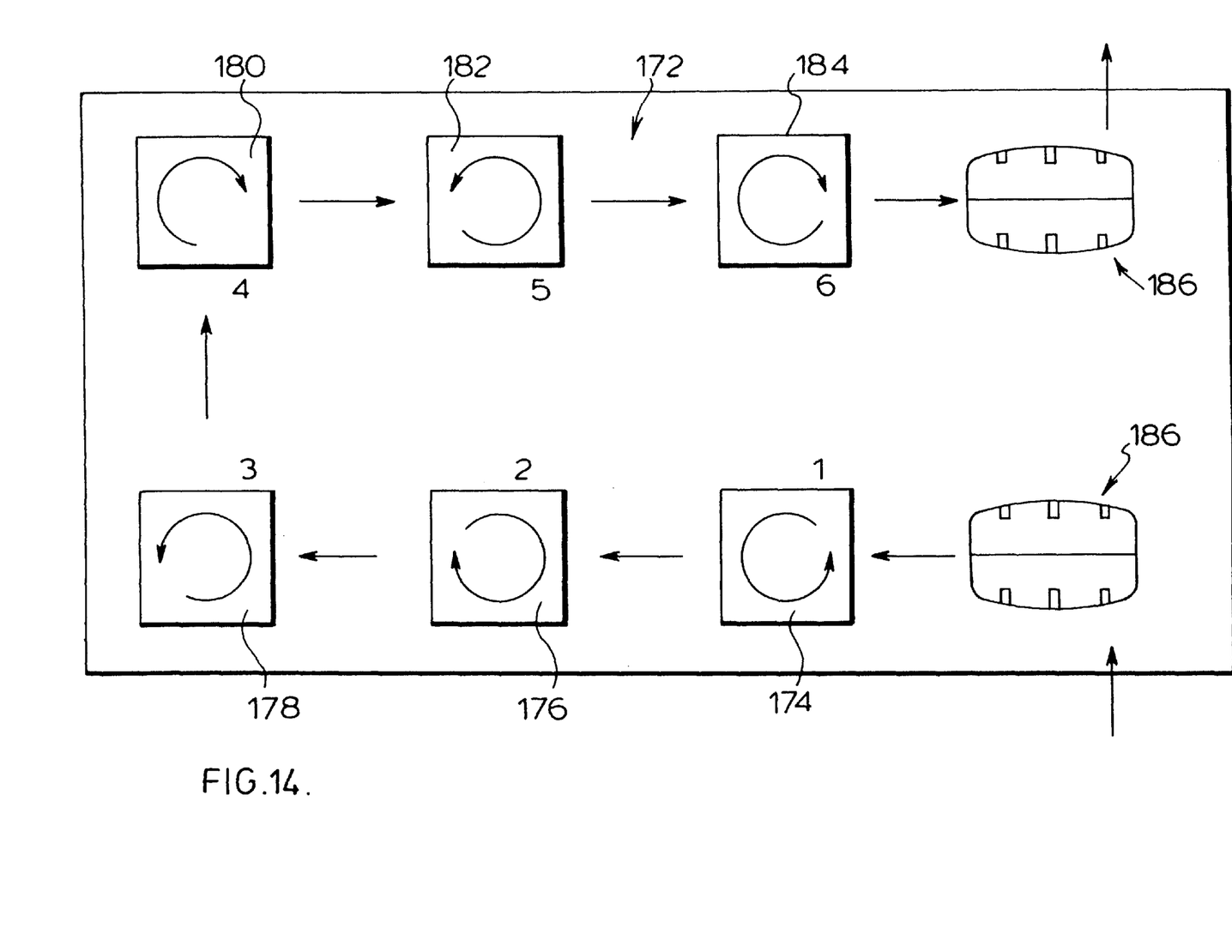
FIG. 14 is a top schematic view of several workstations for finishing bumpers carried on fixtures.

FIG. 14 schematically shows an enlarged worktable 172 which has six separate workstations 174, 176, 178, 180, 182 and 184. At each workstation, the rotation of the rotary head and/or the direction in which the fixture is rotated may be varied. Each fixture 186 which, in accordance with this embodiment, has two bumpers and is like the fixture of FIG. 9, passes through each station to achieve finishing of the selected surface of each bumper and, as well, as it proceeds through the stations, the grit of the finishing wheels may be different to enhance at each subsequent station the quality and smoothness of the finish.

The bumper finishing system, in accordance with this invention, permits one to finish a variety of styles of bumpers without requiring any subsequent hand finishing and at the same time achieve a superior surface due to the precise control in guiding the contoured surface of the bumper past the respective finishing heads. The substantial weight of the finishing head and its drive may be held in a fixed position so that elaborate robotic systems are not required to manage the movement of the rotating head and at the same time deal with centrifugal forces and the like. The fixture for the bumper is of readily fabricated materials although the fixture needs to be customized to each bumper. But once the fixture is made, it is of robust structure and would last for the corresponding longevity of the particular bumper style.

With the embodiment of FIG. 9, it is appreciated that the fixture may be adapted to carry two different bumper styles where the guide for each respective bumper has the profile to match that bumper style. This can provide for variation in bumpers to be finished as the fixture travels through the various workstations, such as shown in FIG. 14. It is also appreciated that, where warranted, the finishing head may be mounted on a pivotal arm. The pivotal arm may include a sensor which causes the finishing head to swing away from or toward the bumper to accommodate sudden variations in the bumper profile. As a result, not only is the movement of the fixture guided, but as well the movement of the finishing head could also be guided. It is therefore apparent that the finishing system of this invention is better adapted to provide for controlled movements of the bumper to achieve a better finish. In accordance with the preferred embodiments, this can be achieved with a minimum number of finishing heads and hence save overall on machining devices and overall size of the finishing system. It is also understood that, in achieving better finish, the guides can be designed to mirror either in an enlarged format or a reduced format the profile of the bumper where the guide follower is designed to even follow tight radiuses in the guide profile. For example, should the guide follower be spaced-apart rollers, the spacing between the rollers can be minimized where warranted to follow tight radiuses of a selected particular profile.

Although preferred embodiments of the invention have been described herein in detail, it will be understood by those skilled in the art that variations may be made thereto without departing from the spirit of the invention or the scope of the appended claims.

What is claimed is:

1. A fixture for use in an apparatus for finishing a longitudinally extending bumper surface of a particular style, the fixture comprising:
   i) a jig for supporting a bumper and means for securing a bumper to said jig;
   ii) a guide having a contoured profile which is unique to and follows a longitudinal contour peculiar to a style of bumper to be secured in said jig;
   iii) means for supporting said jig above and connecting said jig to said guide; and
   iv) means engagable by an external drive for advancing said guide along its contoured profile.

2. A fixture of claim 1 wherein said means engagable by an external drive is a link chain secured to said guide.

3. A fixture of claim 1 wherein said guide comprises an elongate member having said contoured profile on one side of said member and said means engagable by said external drive on an opposite side of said member whereby said member is gripped between said external drive and a guide follower.

4. A fixture of claim 1 wherein a friction reducing material is provided on an underside of said guide to facilitate movement of said guide on a worktable.

5. A fixture of claim 4 wherein said support means includes a standard behind said guide to balance bumper load when a bumper is secured in said jig, said standard having an ultra high density plastic on its underside to facilitate movement of said support standard on a worktable.

6. A fixture of claim 1 wherein said guide comprises an elongate body portion having a channel formed therein, said channel having parallel sidewalls which define said contoured profile.

7. A fixture of claim 1 wherein said guide comprises a track extending along said fixture, said track having said contoured profile.

8. An apparatus for finishing a longitudinally extending bumper surface of a particular style, said apparatus comprising:
   i) a rotary finishing head positioned in a desired orientation above a worktable surface;
   ii) a fixture for carrying a bumper past said rotary finishing head, said fixture having a guide with a contoured profile which is unique to and follows a longitudinal contour peculiar to a style of bumper to be secured in a jig;
   iii) an external drive for engaging said fixture and advancing said guide along its contoured profile to guide movement of said fixture in coordinating travel of a unique contoured surface of a bumper in said fixture past said finishing head.

9. An apparatus of claim 8 wherein means is provided for supporting a fixture jig for a bumper above and connecting said jig to said guide, said jig having clamps to secure a bumper to said jig.

10. An apparatus of claim 9 wherein said guide comprises an elongate member having said contoured profile on one side of said member and on an opposite side of said member is means engagable by said external drive to advance said guide, a guide follower being provided opposite said external drive and spaced therefrom whereby said member is gripped between said external drive and a guide stabilizer.

11. An apparatus of claim 10 wherein said external drive and said guide follower are mounted on said apparatus for relative movement, means for controlling said relative movement to grip said member between said external drive and said guide follower.

12. An apparatus of claim 11 wherein a worktable is provided, said external drive and said guide follower projecting above said worktable, said means for controlling relative movement being below said worktable surface.

13. An apparatus of claim 12 wherein said member rides on said worktable.

14. An apparatus of claim 12 wherein said means engagable by said external drive is a link chain secured to said member, and said external drive is a chain drive sprocket.

15. An apparatus of claim 12 wherein a first station has said finishing head fixed to rotate about a first axis and a second station has a second finishing head fixed to rotate about a second axis said two axes of said finishing heads finishing different longitudinal contoured surfaces of said bumper.

16. An apparatus of claim 10 wherein said guide follower comprises spaced apart rollers for engaging said guide profile, said rollers being positioned on either side of said external drive.

17. An apparatus of claim 9 wherein said guide comprises an elongate portion having a channel formed therein, said channel having parallel sidewalls which define said contoured profile, a guide follower being inserted in said channel to follow the contour of said channel as said external drive moves said fixture past said finishing head.

18. An apparatus of claim 17, wherein said guide comprises a track extending along said fixture, said track having said contoured profile, and a guide follower for engaging said track to follow the contour of said channel as said external drive moves said fixture past said finishing head.

19. An apparatus of claim 8 wherein means is provided for controlling and reversing said direction of said external drive to permit reciprocating bumper travel past said fixed finishing head.

20. An apparatus of claim 19 wherein said external drive control means, controls speed of said external drive.

21. An apparatus of claim 8 wherein two of said fixtures are secured in mirror image relationship with respective guides to provide for finishing of two bumpers.

22. A fixture for use in an apparatus for finishing a longitudinally extending bumper surface of a particular style, the fixture comprising:

a jig for supporting a bumper and means for securing a bumper to said jig;

a guide having a contoured profile which is unique to and follows a longitudinal contour peculiar to a style of bumper to be secured in said jig;

means for supporting said jig above and connecting said jig to said guide; and means engageable by an external drive for advancing said fixture along the contoured profile.

* * * * *